United States Patent
Betts, III et al.

(10) Patent No.: US 6,486,259 B1
(45) Date of Patent: Nov. 26, 2002

(54) EBONITE TAPE

(75) Inventors: William L. Betts, III, Redwood City, CA (US); Rong Jong Change, Fremont, CA (US)

(73) Assignee: 3L&T, Inc., Mountain View, CA (US)

( * ) Notice: Subject to any disclaimer, the term of this patent is extended or adjusted under 35 U.S.C. 154(b) by 0 days.

(21) Appl. No.: 09/724,715

(22) Filed: Nov. 28, 2000

(51) Int. Cl.⁷ ............................... C08F 8/00; C08L 9/00
(52) U.S. Cl. ................. 525/192; 525/194; 525/195; 525/196; 525/232; 525/238; 525/240; 427/386; 428/500; 524/515; 524/521; 524/525
(58) Field of Search .................. 525/192, 194, 525/195, 196, 232, 238, 240; 427/386; 428/500; 524/515, 521, 525

(56) References Cited

U.S. PATENT DOCUMENTS

| | | | | |
|---|---|---|---|---|
| 4,045,380 A | * | 8/1977 | Blunt et al. | 525/240 |
| 4,552,816 A | * | 11/1985 | Spahic et al. | 428/420 |
| 4,567,093 A | | 1/1986 | Sogabe et al. | 428/250 |
| 5,280,064 A | * | 1/1994 | Hesp et al. | 626/54.5 |
| 5,397,835 A | * | 3/1995 | Olivier | 525/66 |
| 5,705,564 A | * | 1/1998 | Liang et al. | 525/54.5 |
| 5,766,687 A | * | 6/1998 | Rappaport | 427/386 |
| 5,997,953 A | | 12/1999 | Rappoport | 427/386 |
| 6,004,425 A | * | 12/1999 | Born et al. | 156/333 |
| 6,303,683 B1 | * | 10/2001 | Figovsky | 524/495 |

FOREIGN PATENT DOCUMENTS

WO    WO 00/06639    2/2000

OTHER PUBLICATIONS

Roman Milczarek, "Rubber–to–Metal Bonding Agents", Mar. 1996, Rubber World, p. 26–31.
J.R. Scott, Encyclopedia of Polymer Science & Technology, John Wiley & Sons, N.Y., vol. 12 pp. 161–177, (1970).
Alan R. Luxton, "The Preparation, Modification and Application of Nonfunctional Liquid Polybutadienes", Rubber Chemistry and Technology, vol. 54 (1981) 3, p. 596–626.

* cited by examiner

*Primary Examiner*—Nathan M. Nutter
(74) *Attorney, Agent, or Firm*—Lumen Intellectual Property Services Inc.

(57) ABSTRACT

An ebonite tape for coating metal substrates is made either of a single component mixture or a two-component mixture. A single component mixture includes unsaturated polymers, a sulfur vulcanization agent, a sulfur solubilizer, a vulcanization accelerator, and a vulcanization activator. Preferably, the sulfur solubilizer is polyamine, and the vulcanization accelerator is tetramethylthiuram disulfide. Reaction of polyamine and tetramethylthiuram disulfide causes a gelation in the mixture at ambient condition. A two-component mixture includes first and second components. First component includes first unsaturated polymers having first functional groups capable of reaction at ambient temperature, a sulfur vulcanization agent, and a vulcanization activator. Second component includes second unsaturated polymers having second functional groups that will react with first functional groups of the first unsaturated polymers at ambient condition, which causes a gelation in the mixture. Single component mixture or two-component mixture is mixed and cast onto a release paper to form a soft elastic tape. The tape is then wrapped on a substrate and baked at elevated temperature for vulcanization to form a tough coating on the substrate.

27 Claims, No Drawings

EBONITE TAPE

CROSS-REFERENCE TO RELATED APPLICATIONS

This application is related to U.S. patent application Ser. No. 09/724,698 filed Nov. 28, 2000, which is incorporated herein by reference.

FIELD OF THE INVENTION

This invention relates generally to ebonite coatings for metal substrates. More particularly, it relates to an ebonite tape.

BACKGROUND ART

There is a pervasive and continuing need for protecting metals from corrosive chemical action, such as in metal pipes, stacks, chimneys, bridges, chemical plant constructions, ship hulls, and containers for aggressive chemicals, to name just a few applications. In addition to having a high resistance to chemical action, an ideal coating has certain other properties: the raw materials required to produce the coating are preferably commercially available, inexpensive and non-hazardous; the coating should have the ability to be easily applied to the metal; the coating adheres strongly to many different metals; the coating should be strong, hard, abrasion resistant and thermostable; and the hardening process of the coating can be performed in contact with moisture, does not require extreme or long heating, and does not release toxic fumes. An ideal metal coating may have many additional properties, depending on the particular application or purpose of the coating.

The most widespread anticorrosive coatings possessing many of the above properties are polyurethanes and epoxide resins (see for example, *Coating Systems: A guidance Manual For Field Surveyors,* American Bureau of Shipping and Affiliated Companies, 1995). These coatings have good chemical resistance to many substances, have adhesion to metals that is satisfactory for many purposes, and have good mechanical properties. Neither polyurethanes nor epoxide resins, however, satisfy all the criteria for an ideal coating for metal. In particular, although polyurethanes have outstanding oil-gasoline resistance, a unique combination of favorable physical-mechanical properties, and strong adhesion to some metals, they are not stable under elevated temperature, alkaline hydrolysis:, and persistent tension. Epoxide resins, although they have outstanding adhesion to some metals, do not have a satisfactory resistance to acids, certain solvents, temperature changes, and vibration. One of the most significant problems associated with both epoxide resins and polyurethanes is their susceptibility to underfilm corrosion associated with defects in the coating surface. Because these coatings are bonded to the metal only by adhesive bonding, these bonds can be broken by the introduction of moisture, solvents or other substances.

As is known from rubber chemistry (*Encyclopedia of Polymer Science & Technology,* John Wiley & Sons, N.Y., vol 12, p.161, 1970), solid ebonite, commonly known as hard rubber, is a polymer material with sulfur content used for vulcanization. Ebonite, like elastomeric or flexible rubber, is made from a combination of sulfur with polydienes (unsaturated rubbers containing double bonds). The sulfur and polydienes are combined with some auxiliary additives and heated to produce vulcanization. Typical mass ratios of sulfur to rubber are 2:100 for elastomeric rubber and 40:100 for hard rubber. Due to the large degree of sulfide cross-linking formed in the vulcanization process, solid ebonite is a hard, non-flexible, plastic-like material possessed of unique chemical resistance to aggressive substances such as acids, alkalis, salt solutions, oil, and gasoline. In addition, solid ebonite has good mechanical properties. Consequently, these conventional rubbers are commonly used as materials for fuel tanks, containers for aggressive substances, and other applications. In spite of these advantages, however, solid rubbers can not be easily applied to metal surfaces, they release toxic fumes during vulcanization, and they require a long time to harden.

More than 30 years ago liquid rubbers were synthesized. (See Alan R. Luxton, "The Preparation, modification and application of non-functional liquid polybutadienes", *Rubber Chemistry and Technology,* 54 (1981) 3, 596-626.) Like earlier rubbers, liquid rubbers are formed from compounds such as polybutadiene, polyisoprene, butadiene-styrene, and butadiene-nitrile. In contrast to the hard rubbers, which are made from such compounds having molecular weights on the order of 100,000 to 500,000, the liquid rubbers are made from such compounds having molecular weights of only 2,000 to 4,000. Consequently, the low molecular weight rubbers permit castable processing by pouring, spreading, spraying, or rolling, while providing similar properties as the hard rubbers after curing. Liquid rubber, therefore, may be used to more easily coat metal surfaces.

Liquid ebonite mixture (LEM) compositions are disclosed by Figovsky in WO 0,006,639 issued Feb. 10, 2000, and liquid rubber based ebonite coating has been disclosed by Rappoport in U.S. Pat. No. 5,766,687 issued Jun. 16, 1998 and U.S. Pat. No. 5,997,953 issued Dec. 7, 1999. The liquid ebonite compositions have advantage of applying, by brushing, rolling or spraying a thin layer to coat any surface with complex geometry, such as bolts and anchors. The liquid coatings can usually stick to the substrate directly without using additional primer or adhesive. However, it is usually inconvenient and messy to handle. Furthermore, the coating is heated by hot air or steam to typically 160° C. to 180° C. for vulcanization.

Ebonite rubber sheets have been produced for coating metal substrates. The ebonite rubber sheets of prior art are either extruded or calendered to give a relatively thick layer, typically greater than 0.0.625 inch, which is easy to handle and can be cut into any desired shapes. However, due to its thickness and high modulus, the rubber sheets of prior art can only be applied by laying them onto a substrate without stretching. It is usually very craft sensitive to lay and join rubber sheets neatly to provide a complete surface coverage. In addition, such sheets can not effectively coat a substrate with complex geometry, such as bolts and anchors. Furthermore, an adhesive or primer is invariably required to fix and bond rubber sheets onto the substrate. In addition, similar to liquid ebonite coating, the same vulcanization condition is required to cure the laid rubber sheet.

There is a need, therefore, for an ebonite tape that will overcome the disadvantages of the prior art, while maintaining all ebonite key properties, such as chemical resistance and tenacious bonding to metal.

SUMMARY

Disadvantages associated with the prior art are overcome by an ebonite tape formed by either a single component mixture or a two-component mixture.

According to a first embodiment of the present invention, an ebonite tape is made by a single component mixture. The mixture includes unsaturated polymers, a vulcanization agent, a vulcanization activator, a solubilizer for the vulcanization agent, and a vulcanization accelerator. Unsaturated polymers can be polybutadiene, polyisoprene, or poly (butadiene-co-acrylonitrile), which contain high amount of unsaturation (typically double bonds) in the backbones for forming linkage with a high loading of the vulcanization agent. The mass parts of unsaturated polymers in the mixture are 100. Unsaturated polymers may or may not contain functional groups, such as hydroxyl, epoxy or acrylic, and may be partially epoxidized.

A preferable vulcanization agent is sulfur, with mass parts of approximately 15–50, preferably 30–50. A solubilizer for sulfur preferably contains polyamine, such as aliphatic, cycloaliphatic, amidoamide, and polyamide amine, with the mass parts approximately 1.5–6. The vulcanization accelerator preferably contains thiuram disulfide, such as tetramethylthiuram disulfide, tetraethylthiuram disulfide, tetrabutylthiuram disulfide, tetraisobutylthiuram disulfide, and tetrabenzylthiuram disulfide, and its mass parts is approximately 3–5. The thiuram disulfide will react with polyamine and causes the mixture to gel at ambient condition.

The vulcanization activator may contain zinc oxide or zinc stearate, and its mass parts are approximately 5–35. The mixture further includes a viscosity reducer for adjusting the viscosity of the mixture and the surface tack of the tape. The viscosity reducer can be any liquid rubber, which is compatible with and has a lower viscosity than the unsaturated liquid rubber. Furthermore, the viscosity reducer is reasonably non-volatile so that no significant weight loss occurs during vulcanization condition. The mass parts of the viscosity reducer is approximately 0–30. The single component mixture additionally includes a thixotropic agent of fume silica or bentonite with mass parts approximately 0–10, and a reinforcing agent of carbon black with mass parts approximately 0–10.

The single component mixture is mixed and cast on a release paper, such as silicone release paper, polypropylene release paper, or polyethylene terephthalate release paper, at ambient condition. The mixture gels after four days and turns into a soft elastic tape that typically has a tensile strength at 100% elongation less than 100 psi, and an elongation greater than 50%. An ebonite coating is formed on a metal substrate by wrapping the ebonite tape onto the substrate and baking it at elevated temperature for vulcanization.

According to a second embodiment of the present invention, an ebonite tape is made by a two-component mixture. First component of the mixture includes first unsaturated polymers, a sulfur vulcanization agent, and a vulcanization activator. Selected first unsaturated polymers contain first functional groups, such as hydroxyl, epoxy, acrylic, and their combinations, which are capable of reaction at ambient condition.

Second component includes second unsaturated polymer having second functional groups, such as isocyanate or maleic anhydride, which will react with the first functional groups at ambient condition. Upon mixing the first and second components, the first functional groups will react with the second functional groups at the ambient condition, with or without the aid of a catalyst, to form an elastic network, thereby the two-component mixture gels at ambient condition. By adjusting the molecular weight and the stoichiometry of the first and second unsaturated polymers, desired low modulus, high elongation and surface tack suitable for the tape application are achieved. Furthermore, the second unsaturated polymers must be thermodynamically compatible with the first unsaturated polymers so that the macroscopic phase separations will not occur and the sulfur vulcanization can happen homogeneously throughout the coating.

The first and second unsaturated polymers must contain sufficient unsaturation in the backbones for forming linkages with the vulcanization agent. It is preferable that the polymer backbone is polybutadiene. However, polyisoprene, poly (butadiene-co-acrylonitrile), poly(isobutyl-co-isoprene), and poly(ethylene-co-propylene-co-diene) can also be used. The mass parts of the first unsaturated polymers in the mixture is 50, and the mass parts of the second unsaturated polymers is approximately 50–100. Alternatively, functional terminated polymers that are partially epoxidized can be used as the first unsaturated polymers. In addition, toluene diisocyanate terminated prepolymers and 4,4'-methylene diphenyldiisocyanate prepolymers are also used as the second unsaturated polymers.

In addition, first and second components may include first and second viscosity reducers for adjusting the viscosity of the mixture and the surface tack of the tape. The first and second viscosity reducers must have lower molecular weight and lower viscosity than the first and second unsaturated polymers respectively. The mass parts of the first and second viscosity reducers are approximately 0–30.

Furthermore, the first component may include a thixotropic agent of fume silica or bentonite, and a reinforcing agent of carbon black. Mass parts of the thixotropic agent and the reinforcing agent are approximately 0–10. The amount of thixotropic agent and reinforcing agent should be minimized so that they will not increase the viscosity of the mixture drastically.

The first component, preferably but not absolute necessarily, further includes a sulfur solubilizer. Preferred sulfur solubilizer is polyamine with the mass parts approximately 1.5–6. In addition as serving as a solubilizer, polyamine is also reactive to the isocyanate groups in the second unsaturated polymers to form polyurea linkages, which accelerates the gelation process. Furthermore, a urethane catalyst is also added into the first component with mass parts approximately 0–3.

A vulcanization accelerator is additionally added into either first or second components. If thiuram disulfide, such as tetramethylthiuram disulfide, tetraethylthiuram disulfide, tetrabutylthiuram disulfide, tetraisobutylthiuram disulfide, and tetrabenzylthiuram disulfide, is used as the vulcanization accelerator, it must be added into the second component since it works synergistically with polyamine contained in the first component, which accelerates the sulfur vulcanization, but also causes the first component mixture to gel. Thus, to maintain sufficient shelf life, thiuram disulfide must be separated from polyamine and is mixed into the second component. The mass parts of thiuram disulfide accelerator in the mixture is approximately 1–10. If diphenylguanidine (DGP) is used as a vulcanization accelerator, since DGP can be mixed with polyamine in the first component without causing a shelf life problem, it can be added in the first component. The mass parts of DPG in the mixture is approximately 1–7.

Optionally, both first and second components can contain other commonly used compounding ingredients, such as fillers, plasticizers, tachifiers, antioxidant, antiozonants, surfactants, wetting agents, defoamers, deaerants, antifouling agents, biocides, corrosion inhibitors, and rheology modifiers.

The first and second components are first formed separately by mixing their compositions. The two components are then mixed together with a mass ratio of between about 0.75 and about 2.75. Two-component mixture is then cast onto a release paper at ambient condition. The mixture gel in 10 minutes and turn into a soft elastic tape that has a tensile strength at 100% elongation less than 100 psi, and an elongation greater than 50%. The tape is wrapped onto a metal substrate and is baked at elevated temperature for sulfur vulcanization to form a coating on the substrate.

The above embodiments provide an ebonite tape that is easy to handle and quick to apply while maintaining all ebonite key properties. The inventive ebonite tape has low modulus and high elongation so that it can be stretched during application to provide some compressive force on a metal substrate, and thereby to ensure good contact and adhesion to the metal substrate as well as to itself. The inventive ebonite tape also can be wrapped multiple times to achieve any desired coating thickness.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and: without imposing limitations upon, the claimed invention.

An ebonite tape can be made by either a single component mixture or a two-component mixture. According to the first embodiment of the present invention, the ebonite tape is made by a single component mixture. The mixture includes unsaturated polymers, a vulcanization activator, a vulcanization agent, a solubilizer for the vulcanization agent, and a vulcanization accelerator. Unsaturated polymers must contain sufficient diene unsaturation in the backbones for forming linkages with the vulcanization agent. It is preferable that unsaturated polymers contain backbones of polybutadiene. However, polyisoprene, poly(butadiene-co-acrylonitrile) and the like can also be used. Unsaturated polymers may contain no functional groups, or they may contain additional functional groups, such as hydroxyl, epoxy, or acrylic. An example of such unsaturated liquid polymers is Polybd-R45HTLO (supplied by Atofina). A partially epoxidized unsaturated polymers also can be used.

Sulfur is a preferred vulcanization agent. Vulcanization activator can be zinc oxide. The selections of sulfur and zinc oxide are not critical. However, it is preferable that they have fine particle sizes to make mixing easier. Alternatively, zinc stearate can be used as the vulcanization activator. A preferred solubilizer for sulfur is polyamine, such as aliphatic, cycloaliphatic, amidoamine, and polyamide amine. An example of polyamine is Unirez 2140 (supplied by Arizona Chemicals). The vulcanization accelerator preferably contains tetramethylthiuram disulfide (e.g., Methyl Tuads supplied by R.T. Vanderbilt). However, tetraethylthiuram disulfide, tetrabutylthiuram disulfide, tetraisobutylthiuram disulfide, and tetrabenzylthiuram disulfide can also be used. Polyamine works synergistically with tertamethylthiuram disulfide to accelerate the sulfur vulcanization that makes the sulfur curing feasible at 80° C. Furthermore, the reaction of polyamine and tetramethyltiuram disulfide will cause the mixture to gel at ambient condition.

The mixture further includes a viscosity reducer, which can be any liquid rubber. The viscosity reducer must be thermodynamically compatible with unsaturated polymers. The viscosity reducer should also be reasonably nonvolatile so that no significant weight loss occurs during vulcanization condition, typically between 180° C. for 30 minutes to 80° C. for three days. Furthermore, the viscosity reducer must have a viscosity lower than the viscosity of the unsaturated polymers.

In addition, carbon black is added into the mixture as a reinforcing agent, colorant and UV stabilizer. Furthermore, the mixture can include a thixotropic agent, such as fume silica or bentonite. The amount of the reinforcing agent and the thixotropic agent should be minimized so that they will not increase the viscosity of the mixture drastically.

Typical compositions of a single component mixture is shown in Table 1. The mass parts of a compound is number of parts by mass of the compound in the mixture.

TABLE 1

| Compound | Description | Mass Parts |
| --- | --- | --- |
| Liquid polybutadiene | Liquid unsaturated rubber | 100 |
| Fume Silica | Thixotropic agent | 0–10 |
| Carbon black | Reinforcing agent | 0–10 |
| Zinc oxide | Vulcanization activator | 5–35 |
| Sulfur | Vulcanization agent | 30–50 |
| Polyamine | Sulfur solubilizer | 1.5–6 |
| Tetramethyltiuram disulfide | Vulcanization accelerator | 3–5 |
| Non-functional liquid polybutadiene | Viscosity reducer | 0–30 |

The mixture is mixed by charging the liquid polybutadiene, sulfur, zinc oxide, tetramethyltiuram disulfide, and optionally fillers, such as fume silica and carbon black, into a metal can. The mixture is subjected to a high shear mixer, commonly known as Cowles or Lightning mixer, operated at 300 to 3000 rpm for 30 minutes. Due to the shear action, the solid powders (i.e., sulfur, zinc oxide, tetramethylthiuram disulfide, carbon black, and fume silica) are evenly distributed and dispersed into the liquid polybutadiene to form a homogeneous viscous liquid. At this stage, the temperature of the mixture reaches about 65° C. At this time, polyamine is added into the mixture, followed by non-functional liquid polybutadiene.

The reaction of polyamine with tetramethylthiuram disulfide causes the liquid mixture to gel at ambient condition.

However, the single component mixture has a limited shelf life. The liquid mixture will gel in approximately 15 days after polyamine was added into the mixture. Therefore, it is essential to cast and prepare the ebonite tape right away. The ebonite is formed by spreading the mixture on a release paper, such as silicone release paper, polypropylene release paper, and polyethylene terephthalate release paper, by using a doctor blade to form a thin film of about 0.020 inch thickness and about 3 inch width, at ambient condition. After four days, the film gels into an elastic ebonite tape. Ebonite tape made of single component mixture has a tensile stress at 100% elongation less than 100 psi, and an elongation greater than 50%. Since the tape has low tensile strength and high elongation, it can be stretched during application for coating metal substrate, which provide some compressive force on the substrate and thereby to ensure good contact and adhesion to the metal substrate as well as itself.

When using to coat a metal substrate, such as a sandblasted steel pipe of 1 inch outside diameter, the ebonite tape is wrapped, by applying slight tension, around the pipe with a average coating thickness of about 0.035 inch. The coated pipe is baked for vulcanization in an air-circulated oven at 150° C. for 30 minutes.

In a second embodiment of the present invention, an ebonite tape is formed by using a two-component mixture, which overcomes the limited shelf life problem of the single component mixture discussed above. A first component of the mixture includes first unsaturated polymers. Selected first unsaturated polymers must contain first functional groups, such as hydroxyl, epoxy, acrylic that are capable of reaction at ambient condition, and must have a high amount unsaturation (typically double bonds) in the backbones, such as polybutadiene, polyisoprene, poly(butadiene-co-acrylonitrile), poly(isobutyl-co-isoprene) or poly(ethylene-co-propylene-co- diene), for forming sulfur linkages during vulcanization. A preferred liquid unsaturated rubber is Polybd-R45HTLO supplied by Atofina.

The second component typically includes second unsaturated polymers, which have second functional groups that can react with the first functional groups of the first unsaturated polymers at ambient condition, such as isocyanate or maleic anhydride, whereby the mixture can gel at ambient condition. For example, if the first unsaturated polymers contain hydroxyl terminated polybutadiene, then an isocyanate terminated liquid rubber can be used for the second unsaturated polymers. Similar to the first unsaturated polymers, the second unsaturated polymers must contain sufficient unsaturation in the backbones for forming sulfur linkages. Upon mixing of the two-components, the first functional groups and the second functional groups will react at the ambient condition, with or without a catalyst, to form an elastic network. The desired low tensile strength, high elongation, and surface tack suitable for the tape application can be achieved by adjusting molecular weight and stoichiometry of the second functional groups to the first functional groups (or the mix ratio of the first and second components).

A vulcanization agent and a vulcanization activator are added into the first component since a hydroxyl terminated liquid rubber is more inert than an isocyanate terminated liquid rubber. The vulcanization activator can be zinc oxide or zinc stearate. Sulfur is a preferable vulcanization agent with the mass parts approximately 15–50, preferably 30–50. It is preferable that sulfur has fine particle size so that the dispersion will be easier. Furthermore, the first component further includes a thixotropic agent of fume silica or bentonite, and a solubilizer for the vulcanization agent. Sulfur solubilizer preferably contains polyamine, such as aliphatic, cycloaliphatic, amidoamine, and polyamide amine. Carbon black is used as a reinforcing agent, colorant and UV stabilizer. Urethane catalyst, such as dibutyl tin dilaurate (DBTDL), can be mixed in the first component.

The first and second components optionally include the first and second viscosity reducers for adjusting the viscosity of the mixture and the surface tack of the tape. The first and second viscosity reducers usually have lower molecular weights and lower viscosity than those of the first and the second unsaturated polymers.

Furthermore, either first or second component includes a vulcanization accelerator. If thiuram disulfide, such as tetramethylthiuram disulfide, tetraethylthiuram disulfide, tetrabutylthiuram disulfide, tetraisobutylthiuram disulfide, and tetrabenzylthiuram disulfide, is used as the vulcanization accelerator, it must be added into the second component since it works synergistically with polyamine contained in the first component, which accelerates the sulfur vulcanization, but also causes the first component mixture to gel at ambient condition. If diphenylguanidine is used as the vulcanization accelerator, it can be added into the first component without causing a shelf life problem.

Optionally, both first and second components can contain other commonly used compounding ingredients, such as fillers, plasticizers, tachifiers, antioxidant, antiozonants, surfactants, wetting agents, defoamers, deaerants, antifouling agents, biocides, corrosion inhibitors, and rheology modifiers.

A typical formulation of the two-component mixture is shown in Tables 2a and 2b.

TABLE 2a

Compositions of First Component

| Description | Compound | Mass Parts |
| --- | --- | --- |
| First unsaturated polymers | Hydroxyl terminated liquid polybutadiene | 50 |
| Thixotropic agent | Fume silica | 0–10 |
| Reinforcing agent | Carbon black | 0–10 |
| Vulcanization activator | Zinc oxide | 5–35 |
| Vulcanization agent | Sulfur | 30–50 |
| Solubilizer | Polyamine | 1.5–6 |
| Catalyst | Urethane | 0–3 |
| First viscosity reducer | Non-functional liquid polybutadiene | 0–30 |

TABLE 2b

Compositions of Second Component

| Description | Compound | Mass Parts |
| --- | --- | --- |
| Second unsaturated polymers | Isocyanate terminated liquid polybutadiene | 50–100 |
| Vulcanization accelerator | Tetramethylthiuram disulfide | 1–10 |
| Second viscosity reducer | Non-functional liquid polybutadiene | 0–30 |

The first component is mixed by charging the hydroxyl terminated liquid polybutadiene, sulfur, zinc oxide and optional fillers, such as fume silica and carbon black, into a metal can. The mixture is subjected to a high shear mixer, commonly known as Cowles or Lightening mixer, operated at 300 to 3000 rpm for 30 minutes. Due to the shear action, the solid powders (i.e., sulfur, zinc oxide, and optional fillers) are evenly distributed and dispersed into the hydroxyl terminated liquid rubber to form a homogeneous viscous liquid. The temperature of the mixture reaches 65° C. At this time, polyamine is added into the mixture, followed by the non-functional liquid polybutandiene and the catalyst.

The second component is mixed similar to the first component. Since isocyanate is sensitive to moisture, the mixing has to be careful to minimize air and moisture entrapment into the mixture.

The first and second components are then mixed together with a mass ratio between 0.75 and 2.75 for preparing an ebonite tape. For further information on formulations of two-component mixtures, see copending U.S. patent application Ser. No. 09/724,698 filed Nov. 28, 2000.

The two-component mixture is spread on a release paper by using a doctor blade to form a thin film of about 0.020 inch thickness and about 3 inch width, at ambient condition. The film gels into an elastic ebonite tape in 10 minutes and become a soft elastic tape in four to eight hours. Ebonite tape made of two-component mixture has a tensile stress at 100% elongation less than 100 psi, and an elongation greater than 50%. Since the tape has low tensile strength and high elongation, it can be stretched during application for coating metal substrate, which provide some compressive force on the substrate and thereby to ensure good contact and adhesion to the metal substrate as well as itself.

When using to coat a metal substrate, such as a sand-blasted steel pipe of 1 inch outside diameter, the ebonite tape is wrapped, by applying slight tension, around the pipe with a average coating thickness of about 0.035 inch. The coated pipe is baked for vulcanization in an air-circulated oven at about 150° C. for 30 minutes.

ILLUSTRATIONS AND EXAMPLES

To supplement the foregoing disclosure, the following examples are provided to illustrate specific aspects of the invention and particular techniques useful for making various coatings according to the present invention. However, it is to be understood that the examples are for illustrative purposes only and in no manner is the present invention limited to the specific disclosures therein.

Example 1

Compositions of a single component mixture is shown in Table 3.

TABLE 3

| Compound Name | Compound, Description | Mass Parts |
|---|---|---|
| Polybd-R45HTLO | Hydroxyl terminated liquid polybutadiene, liquid unsaturated rubber | 100 |
| Mogul L | Carbon black, reinforcing agent | 1 |
| Kadox 930 | Zinc oxide, vulcanization activator | 35 |
| Redball superfine | Sulfur, vulcanization agent | 50 |
| Unirez 2140 | Polyamine, sulfur solubilizer | 3 |
| Methyl Tuads | Tetramethylthiuram disulfide, vulcanization accelerator | 5 |
| | Subtotal | 129.9 |

Polybd-R45HTLO (supplied by Atofina), Mogul L (supplied by Cabot), Kadox 930 (supplied by American zinc), Reddball superfine (available at International Sulphur), and Methyl Tuads (supplied by R.T. Vanderbilt) were mixed in a metal can. The mixture was subjected to a high shear mixer, such as Cowles or Lightening mixer, operated at 300 to 3000 rpm for 30 minutes. Due to the shear action, the solid powders of Mogul L, Kadox 930, Reddball superfine, and Methyl Tuads were evenly distributed and dispersed into Polybd-R45HTLO liquid rubber to form a homogeneous viscous liquid. The temperature of the mixture reached 65° C. At that time, Unirez 2140 (supplied by Arizona Chemicals) was added into the mixture.

The dispersion of the mixture was checked by a Hegman gauge (ASTM D1210). Solid particles having sizes greater than 0.003 inch were not found in the mixture, which indicated a good dispersion. The mixture had a viscosity of 17,200 cps, which was measured by using a Cole Palmer Viscometer (Model 98936, spindle R7 at 2.5 rpm), according to ASTM D2196.

An ebonite tape having dimensions of 12"×3"×0.020" was prepared by spreading the mixture on a silicone release paper. The mixture gelled in four days and turned into a soft elastic tape. The tape had a tensile stress at 100% elongation of about 16 psi, a Young's modulus of about 3786 psi, a maximum tensile strength of 16 psi, and an elongation of 110%.

The tape was then wrapped around a sand-blasted steel pipe having an outside diameter of 1 inch. The surface of the tape had a slight tack to facilitate bonding between the tape and the steel pipe or between the tape itself during wrapping, but was not too sticky to make the wrapping difficult. The coated pipe was baked at 150° C. for 30 minutes for vulcanization. After vulcanization, the tape turned into a tough coating that had a Shore D hardness of 81D, a tensile strength of 4241 psi, a Young's modulus of 142,564 psi, and an elongation of 6.8%. The bonding between the tape and the steel surface was excellent.

Example 2

Compositions of a two-component mixture are shown in Tables 4a and 4b.

TABLE 4a

Compositions of First Component

| Compound Name | Compound, description | Mass Parts |
|---|---|---|
| Polybd-R45HTLO | Hydroxyl terminated liquid polybutadiene, first unsaturated polymers | 50 |
| Cab-O-Sil M5 | Fume silica, thixotropic agent | 2.9 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Unirez 2140 | Polyamine, sulfur solubilizer | 3 |
| Dabco T12 | Tin, Catalyst | 1.7 |
| Ricon 130 | Non-functional liquid polybutadiene, first viscosity reducer | 13 |
| | Subtotal | 129.9 |

TABLE 4b

Compositions of Second Component

| Description | Compound | Mass Parts |
|---|---|---|
| Krasol LBD3000 | TDI terminated liquid polybutadiene, second unsaturated polymers | 100 |
| Methyl Tuads | Tetramethylthiuram disulfide, vulcanization accelerator | 10 |
| Ricon 130 | Non-functional liquid polybutadiene, second viscosity reducer | 12.2 |
| | Subtotal | 122.2 |

The first component was mixed by charging Polybd-R45HTLO, Cab-O-Sil M5 (available at Cabot), Mogul L, Kadox 930, and Redball superfine into a metal can. The mixture was subjected to a high shear mixer, such as Cowles or lightening mixer, operated at 300 to 3000 rpm for 30 minutes. Due to the shear action, the solid powders of. Cab-O-Sil M5, Mogul L, Kadox 930, and Redball superfine were evenly distributed and dispersed into the Polybd-R45HTLO liquid rubber to form a homogeneous viscous liquid mixture. The temperature of the mixture reached 65° C. At that time, Unirez 2140 was added into the mixture, followed by Ricon 130 (available at Atofina) and Dabco T12 (available at Air Products).

The dispersion of the first component was checked by a Hegman gauge (ASTM D1210). No solid particles having sizes greater than 0.003 inch were detected in the mixture, which indicated a good dispersion. The viscosity of the first component was 60,900 cps at 30° C., which was measured by using a Cole Palmer Viscometer (Model 98936, Spindle R7 at 2.5 rpm) according to ASTM D2196.

The second component was mixed and its viscosity was measured with the same equipment and similar procedure with those used for the first component. The viscosity of the second component was 63,900 cps at 30° C. (Krasol LBD3000 is available at Kaucuk.)

The first and the second components were then mixed together with a mass ratio of 1.06 to 1 (or 129.9/122.2), and then spread onto a silicone release paper to form a tape having dimensions of 12"×3"×0.020". The mixture gelled in ten minutes and turned in a soft elastic tape in four to eight hours at ambient condition. The tape had a tensile stress at 100% elongation of about 53 psi, a Young's modulus 31, 119 psi, a maximum tensile strength of 155 psi, and an elongation of 710%.

The tape was then wrapped around a sand-blasted steel pipe having 1 inch outside diameter. The surface of the tape had slight tack to facilitate bonding between the tape and the pipe or between the tape itself, but it was not too sticky to make the wrapping difficult. The coated pipe was then baked at 150° C. for 30 minutes for sulfur vulcanization. After vulcanization, the tape became a tough coating that had a Shore D hardness of 83D, a tensile strength of 6436 psi, a Young's modulus of 175,223 psi, and an elongation of 8%. The bonding between the tape and the steel surface was excellent.

Example 3

Compositions of the first and second components are similar to those used in Example 2, but two components were mixed with a mass ratio of 2.12 to 1 (or 129.9/61.1), instead of 1.06 to 1 (or 129.9/122.2). Typical compositions of the first and second components are shown in Tables 5a and 5b.

TABLE 5a

Compositions of First Component

| Compound Name | Compound, description | Mass Parts |
|---|---|---|
| Polybd-R45HTLO | Hydroxyl terminated liquid polybutadiene, first unsaturated polymers | 50 |
| Cab-O-Sil M5 | Fume silica, thixotropic agent | 2.9 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Unirez 2140 | Polyamine, sulfur solubilizer | 3 |
| Dabco T12 | Tin, Catalyst | 1.7 |
| Ricon 130 | Non-functional liquid polybutadiene, first viscosity reducer | 13 |
| | Subtotal | 129.9 |

TABLE 5b

Compositions of Second Component

| Description | Compound | Mass Parts |
|---|---|---|
| Krasol LBD3000 | TDI terminated liquid polybutadiene, second unsaturated polymers | 50 |

TABLE 5b-continued

Compositions of Second Component

| Description | Compound | Mass Parts |
|---|---|---|
| Methyl Tuads | Tetramethylthiuram disulfide, vulcanization accelerator | 5 |
| Ricon 130 | Non-functional liquid polybutadiene, second viscosity reducer | 6.1 |
| | Subtotal | 61.1 |

The processes of preparing an ebonite tape from the two-component mixture were performed using similar equipment and in the same way as described in Example 2. The mixture gelled in 10 minutes and turned into a soft elastic tape in four to eight hours at ambient condition. The tape had a tensile stress at 100% elongation of 8.2 psi, a Young's modulus of 23 psi, a maximum tensile strength of 33 psi, and an elongation of 653%.

The tape was wrapped around a sand-blasted steel pipe having 1 inch outside diameter. The surface of the tape had slight tack to facilitate bonding between the tape and the pipe or between the tape itself, but it was not too sticky to make the wrapping difficult. The coated pipe was then subjected to 150° C. for 30 minutes for sulfur vulcanization. After vulcanization, the tape became a tough coating that had a Shore D hardness of 83D, a tensile strength of 6436.5 psi, a Young's modulus of 175,223 psi, and an elongation of 8.22%. The bonding between the tape and the steel surface was excellent.

Example 4

Diphenylguanidine, such as Vanax DPG (supplied by R.T. Vanderbilt), was used as a vulcanization accelerator, which was added into the first component. Also, Krasol NN23 (supplied by Kaucuk), 4,4'-methylene diphenyl diisocyanate (MID) terminated polybutadiene, was used in the second component. The compositions of first and second components are shown in Tables 6a and 6b.

TABLE 6a

Compositions of First Component

| Compound Name | Compound, description | Mass Parts |
|---|---|---|
| Polybd-R45HTLO | Hydroxyl terminated liquid polybutadiene, first unsaturated polymers | 50 |
| Cab-O-Sil M5 | Fume silica, thixotropic agent | 1.2 |
| Mogul L | Carbon black, reinforcing agent | 2.3 |
| Kadox 930 | Zinc oxide, vulcanization activator | 7 |
| Redball superfine | Sulfur, vulcanization agent | 50 |
| Vanax DPG | Diphenylguanidine, vulcanization accelerator | 5 |
| Dabco T12 | Tin, Catalyst | 1.7 |
| Ricon 130 | Non-functional liquid polybutadiene, first viscosity reducer | 13 |
| | Subtotal | 130.2 |

TABLE 6b

Compositions of Second Component

| Description | Compound | Mass Parts |
|---|---|---|
| Krasol NN23 | MDI terminated liquid polybutadiene, second unsaturated polymers | 50 |
| Ricon 130 | Non-functional liquid polybutadiene, second viscosity reducer | 6.1 |
|  | Subtotal | 56.1 |

The mixing of the first and second components were performed using the same equipment and following a similar procedure to that used in example 2. The viscosity of the first and second components were 75,500 cps and 900 cps at 27° C. respectively, which were measured by using similar equipment with those used in example 2.

First and second components were then mixed with a mass ratio of 2.57 to 1. Two-component mixture was then spread on a silicone release paper for forming an ebonite tape having dimensions 12"×3"×0.020". The mixture gelled in 10 minutes and became a soft elastic tape in about four to eight hours at ambient condition. The tape had a tensile stress at 100% elongation of 30 psi, a Young's modulus of 390 psi, a maximum tensile strength of 63 psi, and an elongation of 354%.

The tape was then wrapped around a sand-blasted steel pipe having 1 inch outside diameter. The surface of the tape had slight tack for facilitating bonding between the tape and the pipe or between the tape itself during wrapping, but was not too sticky to make the wrapping difficult. The coated pipe was baked at 150° C. for 30 minutes for vulcanization. The tape became a tough coating after the vulcanization with a Shore D hardness of 79D, a tensile strength of 5211.5 psi, a Young's modulus of 12,913 psi, and an elongation of 6.0%. The bonding between the tape and the steel surface was excellent.

It will be clear to one skilled in the art that the above embodiment may be altered in many ways without departing from the scope of the invention. Accordingly, the scope of the invention should be determined by the following claims and their legal equivalents.

What is claimed is:

1. An ebonite tape comprising a gelled mixture having low modulus, high elongation and surface tack suitable for a plurality of tape applications, wherein the mixture is formed by first preparing separately:
    a) a first component comprising:
        i) first unsaturated polymers having first functional groups capable of reaction at ambient condition with or without a catalyst to form an elastic network, wherein the first functional groups are selected from the group consisting of hydroxyl, epoxy, acrylic, and their combinations;
        ii) a vulcanization activator; and
        iii) a sulfur vulcanization agent, wherein the mass parts of the sulfur vulcanization agent is approximately 15–50; and
    b) a second component comprising:
        i) second unsaturated polymers of mass part 50–100 having second functional groups that react with the first functional groups of the first unsaturated polymers at ambient condition, wherein the second functional groups are selected from the group consisting of isocyanate and maleic anhydride, wherein
        the first and second unsaturated polymers contain sufficient unsaturation in the backbones for forming linkages with the sulfur vulcanization agent, wherein
        the second unsaturated polymers are thermodynamically compatible with the first unsaturated polymers during a vulcanization, and wherein
        the first and second unsaturated polymers are selected from the group consisting of polybutadiene, polyisoprene, poly(butadiene-co-acrylonitrile), poly(isobutyl-co-isoprene), and poly(ethylene-co-propylene-co-diene);
    wherein
        the first and second components are mixed together and the mixture gels at ambient condition thereby forming said gelled mixture, and wherein
        molecular weight and stoichiometry of the first and second unsaturated polymers are adjustable so to achieve desired low modulus, high elongation and surface tack.

2. The ebonite tape of claim 1, wherein the first component and the second component are mixed with a ratio between about 0.75 to 2.75.

3. The ebonite tape of claim 1, wherein the mass parts of the first unsaturated polymers in the mixture is 50.

4. The ebonite tape of claim 1, wherein the first unsaturated polymer is partially epoxidized.

5. The ebonite tape of claim 1, wherein the second unsaturated polymers are toluene diisocyanate terminated prepolymers.

6. The ebonite tape of claim 1, wherein the second unsaturated polymers are 4,4'-methylenediisocyanate terminated prepolymers.

7. The ebonite tape of claim 1, wherein the first and second components further comprise first and second viscosity reducers for adjusting a viscosity of the mixture and the surface tack of the ebonite tape.

8. The ebonite tape of claim 1, wherein the mass parts of each of the first and second viscosity reducers in the mixture are approximately 0–30.

9. The ebonite tape of claim 7, wherein the first and second viscosity reducers have viscosity lower than viscosity of the first and second unsaturated polymers respectively.

10. The ebonite tape of claim 1, wherein the first component further comprises a thixotropic agent.

11. The ebonite tape of claim 10, wherein the thixotropic agent selected from the group consisting of fume silica and bentonite, and wherein the mass parts of the thixotropic agent in the mixture is approximately 0–10.

12. The ebonite tape: of claim 1, wherein the first component further comprises a reinforcing agent.

13. The ebonite tape of claim 12, wherein the reinforcing agent comprises carbon black, and wherein the mass parts of the reinforcing agent in the mixture is approximately 0–10.

14. The ebonite tape of claim 1, wherein the mass parts of the vulcanization agent in the mixture is approximately 30–50.

15. The ebonite tape of claim 14, wherein the first component further comprises a solubilizer for the sulfur vulcanization agent.

16. The ebonite tape of claim 15, wherein the sulfur solubilizer comprises polyamine, and wherein the mass parts of the sulfur solubilizer in the mixture is approximately 1.5–6.

17. The ebonite tape of claim 1, wherein the first component further comprises a urethane catalyst, wherein the mass parts of the urethane catalyst is approximately 0–3.

18. The ebonite tape of claim 1, wherein the vulcanization activator is selected form the group consisting zinc oxide and zinc stearate, and wherein the mass parts of the vulcanization activator in the mixture is approximately 5–35.

19. The ebonite tape of claim 1, wherein one of the first and second components further comprises a vulcanization accelerator.

20. The ebonite tape of claim 19, wherein the first component comprises the vulcanization accelerator, and wherein the mass parts of the vulcanization accelerator is approximately 1–7.

21. The ebonite tape of claim 20, wherein the vulcanization accelerator comprises diphenylguanidine.

22. The ebonite tape of claim 19, wherein the second component comprises the vulcanization accelerator, and wherein the mass parts of the vulcanization accelerator is approximately 1–10.

23. The ebonite tape of claim 22, wherein the vulcanization accelerator is selected from the group consisting of tetramethylthiuram disulfide, tetraethylthiuram disulfide, tetrabutylthiuram disulfide, and tetraisobutylthiuram disulfide, tetrabenzylthiuram disulfide.

24. The ebonite tape of claim 19 is prepared by mixing and casting the mixture on a release paper at ambient condition for 2 to 24 hours.

25. The ebonite tape of claim 24 has a tensile stress at 100% elongation less than 100 psi.

26. The ebonite tape of claim 24 has an elongation greater than 50%.

27. The ebonite tape of claim 24 is wrapped around a substrate and is baked at elevated temperature for vulcanization, whereby a coating is formed on the substrate.

* * * * *

UNITED STATES PATENT AND TRADEMARK OFFICE
CERTIFICATE OF CORRECTION

PATENT NO. : 6,486,259 B1
DATED : November 26, 2002
INVENTOR(S) : William L. Betts, III et al.

It is certified that error appears in the above-identified patent and that said Letters Patent is hereby corrected as shown below:

<u>Title page,</u>
Item [75], Inventor, please amend the second-named inventor's name from
"Rong Jong Change" to -- Rong Jong Chang --.

Signed and Sealed this

Fourth Day of May, 2004

JON W. DUDAS
*Acting Director of the United States Patent and Trademark Office*